US012515466B2

(12) United States Patent
Shirai et al.

(10) Patent No.: US 12,515,466 B2
(45) Date of Patent: Jan. 6, 2026

(54) RECORDING DEVICE

(71) Applicant: SEIKO EPSON CORPORATION, Tokyo (JP)

(72) Inventors: Tomoko Shirai, Suwa (JP); Rikuo Yamada, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 18/193,768

(22) Filed: Mar. 31, 2023

(65) Prior Publication Data

US 2023/0311547 A1 Oct. 5, 2023

(30) Foreign Application Priority Data

Apr. 1, 2022 (JP) ................................ 2022-061666

(51) Int. Cl.
*B41J 29/02* (2006.01)

(52) U.S. Cl.
CPC .................................... *B41J 29/02* (2013.01)

(58) Field of Classification Search
CPC ........................................................ B41J 29/02
See application file for complete search history.

(56) References Cited

U.S. PATENT DOCUMENTS 8,585,305 B2 * 11/2013 Naito .................... B41J 15/042 400/663
2017/0361629 A1 * 12/2017 Shirane .................... B41J 11/04
2020/0307289 A1 * 10/2020 Yato ......................... B41J 29/06

FOREIGN PATENT DOCUMENTS

JP 2014-012413 A 1/2014
JP 2017222496 A * 12/2017 .............. B41J 11/04

* cited by examiner

*Primary Examiner* — Douglas X Rodriguez
*Assistant Examiner* — Tracey M Mcmillion
(74) *Attorney, Agent, or Firm* — WORKMAN NYDEGGER

(57) ABSTRACT

A recording device includes a recording unit configured to perform recording on a medium, a reversing unit configured to bend and reverse the medium on which recording was performed by the recording unit and that is transported along a transport path and guide the medium toward a recording unit side, a base portion disposed below the reversing unit, a first frame fixed to the base portion and disposed on a side of a first side surface of the reversing unit to hold the reversing unit, a second frame fixed to the base portion and disposed on a side of a second side surface different from the first side surface to hold the reversing unit, and a coupling portion coupling the first frame and the second frame to each other at a position away from the base portion.

8 Claims, 10 Drawing Sheets

RECORDING DEVICE

The present application is based on, and claims priority from JP Application Serial Number 2022-061666, filed Apr. 1, 2022, the disclosure of which is hereby incorporated by reference herein in its entirety.

BACKGROUND

1. Technical Field

The present disclosure relates to a recording device such as an ink jet printer.

2. Related Art

As an example of this type of recording device, a recording device disclosed in JP-A-2014-12413 is named. JP-A-2014-12413 discloses a printer including a detachable reversing unit. With the provision of the reversing unit, when a medium transported to a reversing path of the reversing unit is jammed, it is easy to cope with the jam.

In the above-described known printer, when the reversing unit is detached, a force is applied to a frame that holds the reversing unit, and there is a possibility that distortion occurs in the frame around the reversing unit. However, there is no description that takes into account this point.

SUMMARY

According to an aspect of the present disclosure, there is provided a recording device including: a recording unit configured to perform recording on a medium, a reversing unit configured to bend and reverse the medium on which recording was performed by the recording unit and that is transported along a transport path and guide the medium toward a recording unit side, a base portion disposed below the reversing unit, a first frame fixed to the base portion and disposed on a side of a first side surface of the reversing unit, the first frame being configured to hold the reversing unit, a second frame fixed to the base portion and disposed on a side of a second side surface different from the first side surface, the second frame being configured to hold the reversing unit, and a coupling portion coupling the first frame and the second frame to each other at a position away from the base portion.

BRIEF DESCRIPTION OF THE DRAWINGS

FIG. 8A is a plan view and FIG. 7B is a cross-sectional view of an essential part of a second fastening portion of the first embodiment.

DESCRIPTION OF EXEMPLARY EMBODIMENTS

Figure 1:
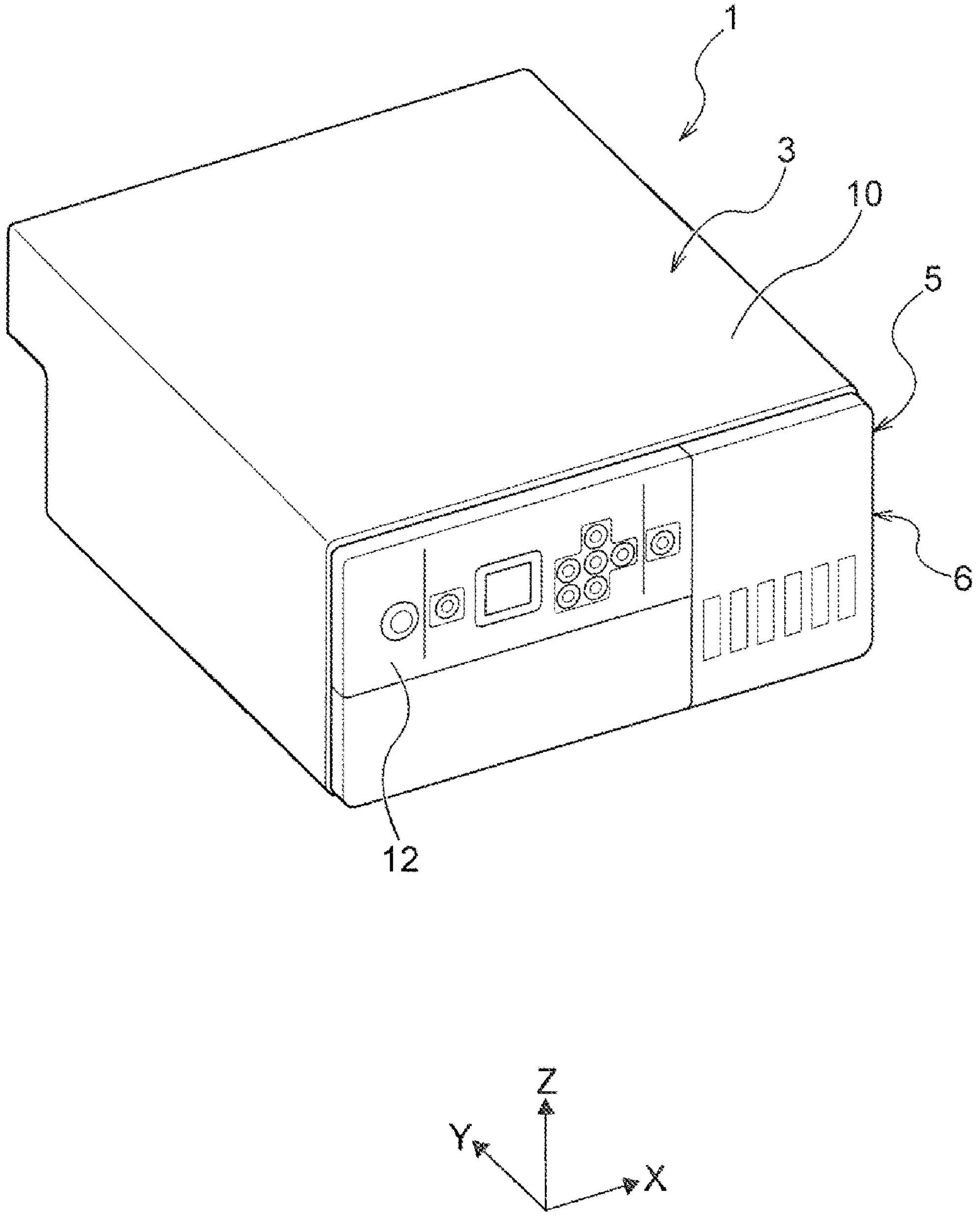
FIG. 1 is an overall external perspective view of a recording device according to a first embodiment.

Hereinafter, the present disclosure will be schematically described first.

According to a first aspect of the present disclosure, there is provided a recording device including: a recording unit configured to perform recording on a medium, a reversing unit configured to bend and reverse the medium on which recording was performed by the recording unit and that is transported along a transport path and guide the medium toward a recording unit side, a base portion disposed below the reversing unit, a first frame fixed to the base portion and disposed on a side of a first side surface of the reversing unit, the first frame being configured to hold the reversing unit, a second frame fixed to the base portion and disposed on a side of a second side surface different from the first side surface, the second frame being configured to hold the reversing unit, and a coupling portion coupling the first frame and the second frame to each other at a position away from the base portion.

According to the present aspect, the recording device includes the base portion disposed below the reversing unit, the first frame fixed to the base portion and disposed on a side of a first side surface of the reversing unit, the first frame being configured to hold the reversing unit, the second frame fixed to the base portion and disposed on a side of a second side surface different from the first side surface, the second frame being configured to hold the reversing unit, and the coupling portion coupling the first frame and the second frame to each other at a position away from the base portion. With such a configuration, even when a force is applied to the first frame and the second frame that are disposed around the reversing unit and hold the reversing unit in removing the reversing unit, the first frame and the second frame are coupled to each other by the coupling portion and hence, a possibility that distortion occurs in the frames around the reversing unit can be reduced.

According to a second aspect of the present disclosure, the recording device is characterized in that, in the first aspect, the base portion, the first frame, and the second frame are formed of a synthetic resin material, and the coupling portion is formed of a metal material.

Here, in this specification, "formed of a metal material" in the expression of "the coupling portion is formed of a metal material" is used to mean a coupling portion that is formed of only a metal material but also a coupling portion partially containing a non-metal material such as a synthetic resin in a composite manner.

According to this aspect, the base portion, the first frame, and the second frame are formed of a synthetic resin material, while the coupling portion is formed of a metal material. Accordingly, it is possible to effectively suppress the occurrence of distortion.

According to a third aspect of the present disclosure, the recording is characterized in that, in the first aspect or the second aspect, the first frame and the second frame include a holding portion configured to hold the reversing unit, and the reversing unit is attachable to and detachable from the holding portion in a state where the first frame and the second frame are coupled to each other by the coupling portion.

According to this aspect, the reversing unit is attachable to and detachable from the holding portion in a state where the first frame and the second frame are coupled to each other by the coupling portion. With such a configuration, the attaching operation and the detaching operation of the reversing unit to and from the holding portion can be easily performed in a state where a possibility that distortion occurs in the frames around the reversing unit is reduced.

According to a fourth aspect of the present disclosure, the recording device is characterized in that, in the first aspect or the second aspect, the coupling portion is disposed at upper surface portions of the first frame and the second frame.

According to this aspect, the coupling portion is disposed at the upper surface portions of the first frame and the second frame and hence, the occurrence of distortion can be effectively suppressed.

According to a fifth aspect of the present disclosure, the recording device is characterized in that, in the first aspect or the second aspect, the coupling portion is fixed to the respective upper surface portions of the first frame and the second frame by a screw.

According to this aspect, the coupling portion is fixed to the respective upper surface portions of the first frame and the second frame by a screw and hence, it is possible to firmly couple the first frame and the second frame to each other.

According to a sixth aspect of the present disclosure, the recording device is characterized in that, in the first aspect or the second aspect, the coupling portion includes a bent portion on a side of one side extending along a longitudinal direction of a base surface portion, and the bent portion has a shape bent with respect to the base surface portion.

Here, in this specification, "bent shape" in the expression of "the bent portion has a shape bent with respect to the base surface portion" is used to mean not only a shape formed by bending a bendable plate surface but also a shape formed by integral molding.

According to this aspect, the coupling portion includes the bent portion having the above-mentioned shape and hence, the strength of the coupling portion is increased in terms of shape, and it is possible to form the coupling portion using a material having a small plate thickness thus realizing the reduction of weight. Further, the strength of the coupling portion is increased and hence, the possibility that the distortion occurs can be effectively reduced.

According to a seventh aspect of the present disclosure, the recording device is characterized in that, in the sixth aspect, the coupling portion includes a wiring support portion at a side of the base surface portion on a side opposite to the bent portion, and the wiring support portion has a shape bent with respect to the base surface portion and is configured to support wiring.

Here, in this specification, "bent shape" is used to mean not only a shape formed by bending a bendable plate surface but also a shape formed by integral molding.

According to this aspect, the coupling portion includes the wiring support portion. With such a configuration, the wiring is held by the wiring support portion and hence, the wiring does not become an obstacle in attaching and detaching the reversing unit so that also a possibility that the wiring is broken is low.

Further, the wiring support portion is formed in a shape bent with respect to the base surface portion and hence, the strength of the coupling portion can be increased in terms of shape. Further, the coupling portion includes the bent portion on a side of one side of the base surface portion, and includes the wiring support portion having the bent shape at a side of the base surface portion on a side opposite to the one side and hence, the strength of the whole coupling portion is further increased by the bent shape located at both sides, and the coupling portion can be formed by a material having a smaller plate thickness, whereby the further reduction of weight can be realized.

According to an eighth aspect of the present disclosure, the recording device is characterized in that, in the first aspect or the second aspect, the coupling portion includes the wiring support portion, on a side of one side extending along a longitudinal direction of a base surface portion, the wiring support portion having a shape bent with respect to the base surface portion and being configured to support wiring.

Here, in this specification, "bent shape" in the expression of "the wiring portion having a shape bent with respect to the base surface portion and configured to support wiring" is used to mean not only a shape formed by bending a bendable plate surface but also a shape formed by integral molding.

According to this aspect, the coupling portion includes the wiring support portion having a shape bent with respect to the base surface portion and configured to support the wiring, on a side of one side extending along the longitudinal direction of the base surface portion. With such a configuration, the strength of the coupling portion can be increased in terms of shape, the coupling portion can be formed of a material having a small plate thickness, whereby the reduction of weight can be realized.

According to a ninth aspect of the present disclosure, the recording device is characterized in that, in the second aspect, the recording device includes a third frame that is extended between the first frame and the second frame, that is configured to movably hold the recording unit, and that is formed of a metal material, and the coupling portion is grounded by the third frame.

According to this aspect, the recording device includes the third frame configured to movably hold the recording unit and formed of a metal material, and the coupling portion is ground-coupled to the third frame. With such a configuration, the grounding of the coupling portion can be easily performed.

According to the ninth aspect of the present disclosure, the recording device is characterized in that, in the first aspect or the second aspect, the recording device includes an outer case forming an external appearance of the recording device, and another recording device is placeable at a top surface of the outer case.

According to this aspect, the recording device includes the outer case forming the external appearance of the recording device, and another recording device is placeable at the top surface of the outer case. With such a configuration, a plurality of recording devices can be used in a stacking manner, and the increase of installation space can be suppressed.

First Embodiment

Hereinafter, a recording device according to a first embodiment is described in detail with reference to FIG. 1 to FIG. 10. In the following description, three axes orthogonal to each other are referred to as an X axis, a Y axis, and a Z axis as illustrated in the respective drawings. A Z-axis direction corresponds to a vertical direction, that is, a direction along which the gravity acts. An X-axis direction and a Y-axis direction correspond to a horizontal direction respectively. In the respective drawings, directions indicated by arrows of the three axes (X, Y, and Z) are + directions of the X-axis direction, the Y-axis direction, and the Z-axis direction, respectively, and directions opposite to the + directions are − directions.

The recording device of the present embodiment is an ink jet printer configured to perform printing by ejecting ink, that is a liquid, to a medium such as paper. Here, it is needless to say that the recording device 1 of the present embodiment is not limited to the ink jet printer.

Figure 2:
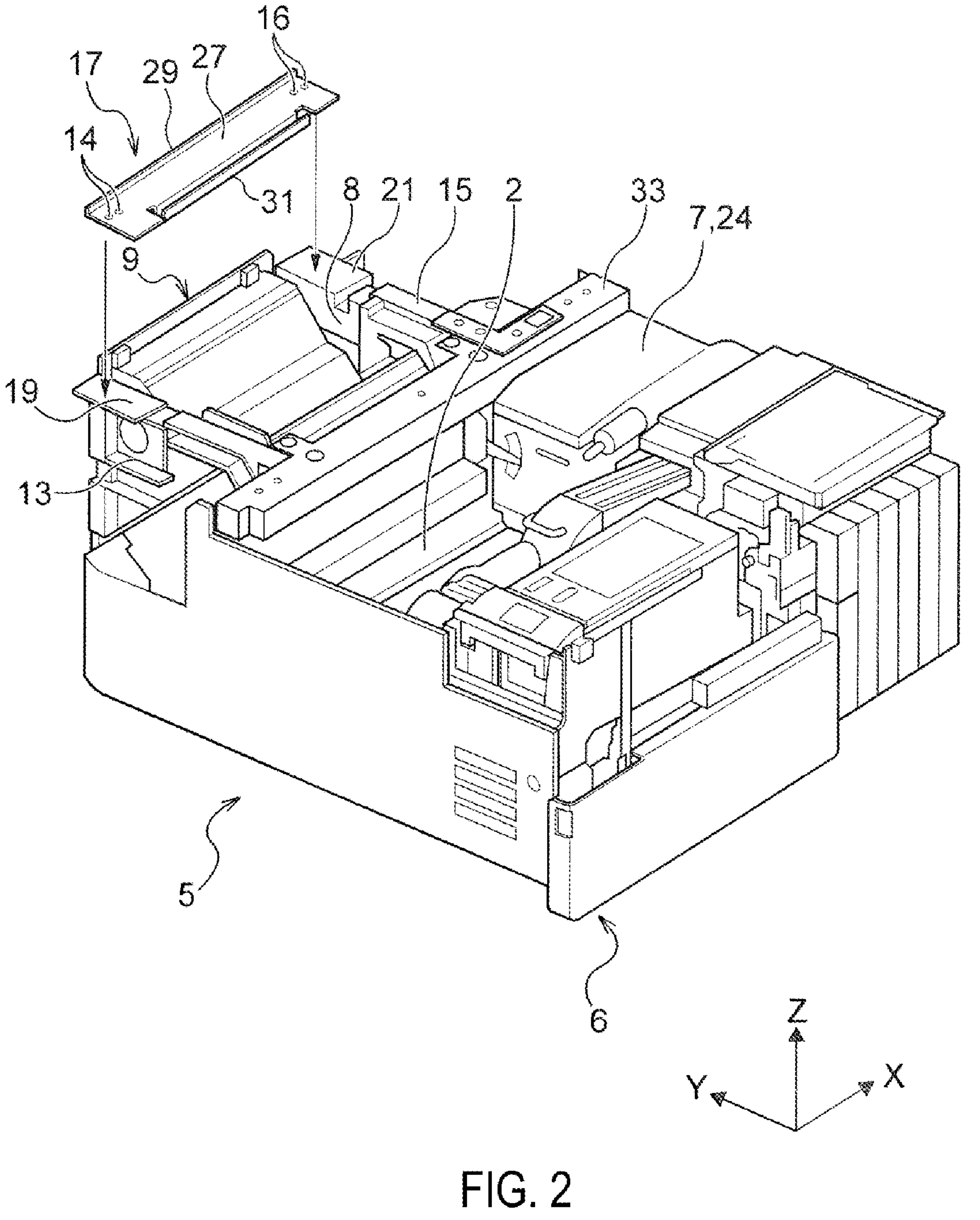
FIG. 2 is a perspective view illustrating a state of a device body of the first embodiment before a coupling portion is attached.
Figure 3:
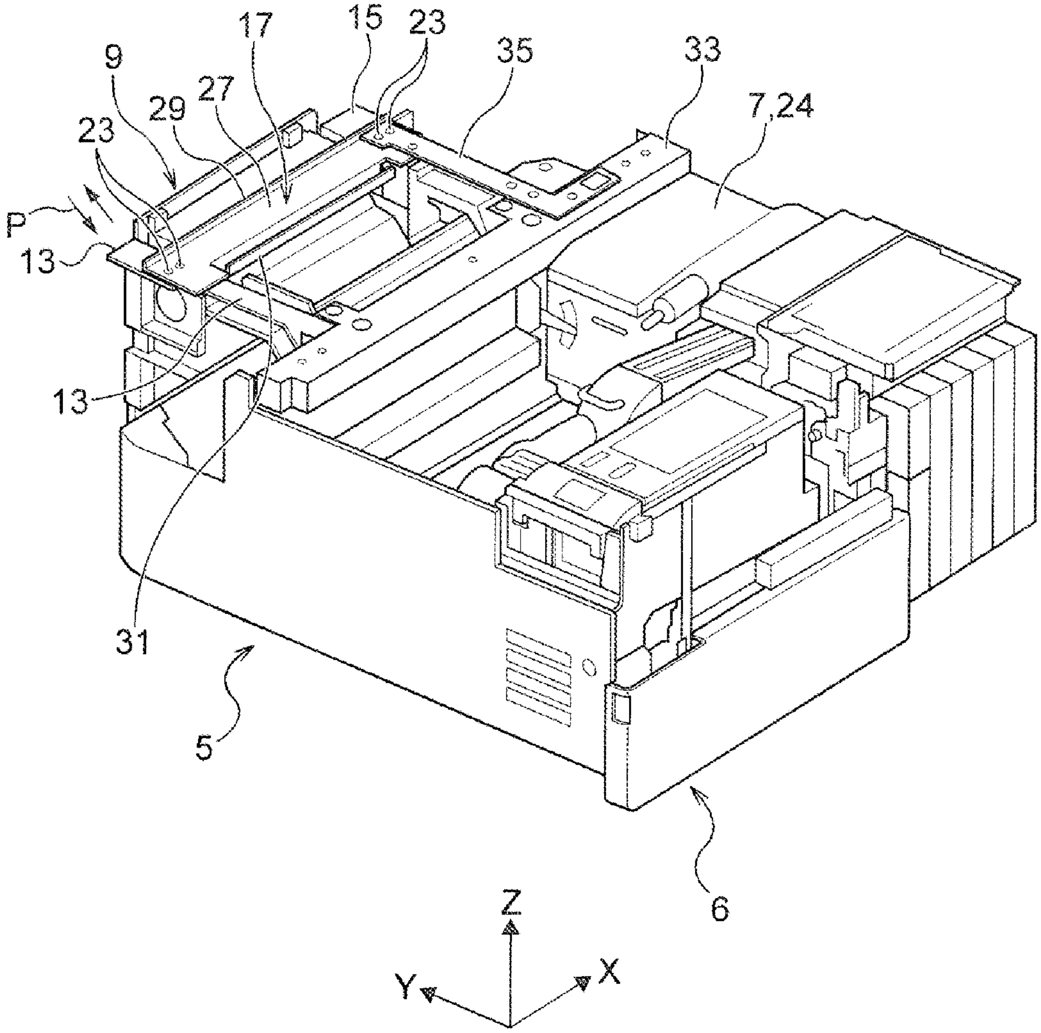
FIG. 3 is a perspective view illustrating a state of the device body of the first embodiment to which the coupling unit is attached.

As illustrated in FIG. 1 to FIG. 3, the recording device 1 includes an outer case 3 that forms an external appearance, and a device body 5 that is provided in the outer case 3 in a drawable manner. Symbol 6 indicates a front portion of the recording device 1. The front portion 6 includes an operation panel 12, and forms an external appearance of the recording device 1 together with the outer case 3. The front portion 6 is attached to the device body 5. In FIG. 1, the device body 5 is configured such that the entire device body 5 can be taken out to the outside of the outer case 3 by pulling out the front portion 6 in the −Y direction.

As illustrated in FIG. 1, the outer case 3 is formed in a box shape. The outer case 3 is configured such that a top surface 10 of the outer case 3 is formed in a flat shape, and another recording device can be placed on the top surface 10. Here, the top surface 10 need not be flat provided that another recording device can be placed on the top surface 10.

The recording device 1 according to the present embodiment includes a recording unit 7 configured to perform recording on a medium, and a reversing unit 9 configured to bend and reverse the medium on which recording was performed by the recording unit 7 and that is transported along a transport path 2 (not illustrated) and guide the medium toward a recording unit 7 side. The recording unit 7 includes a recording head (not illustrated) configured to eject ink onto the medium, and a carriage 24 configured to move in a width direction of the medium in a reciprocating manner while mounting the recording head thereon.

Further, the recording device 1 includes a base unit 11 (FIG. 4) disposed below the reversing unit 9, a first frame 13 fixed to the base unit 11 and disposed on a side of a first side surface 4 of the reversing unit 9 to hold the reversing unit 9, and a second frame 15 fixed to the base portion 11 and disposed on a side of a second side surface 8 different from the first side surface 4 to hold the reversing unit 9.

In the recording device 1, the first frame 13 and the second frame 15 are coupled to each other by a coupling portion 17 at a position away from the base unit 11.

In the present embodiment, the base unit 11, the first frame 13, and the second frame 15 are formed of a synthetic resin material to achieve the reduction of weight.

On the other hand, the coupling portion 17 is formed of a conductive metal material. In the present embodiment, the coupling portion 17 is formed by applying cutting and bending to a metal plate that is a metal material. Here, the coupling portion 17 is not limited to a member formed of only a metal material such as a metal plate, and may be formed of a composite material partially containing a non-metal material such as a synthetic resin.

Figure 4:
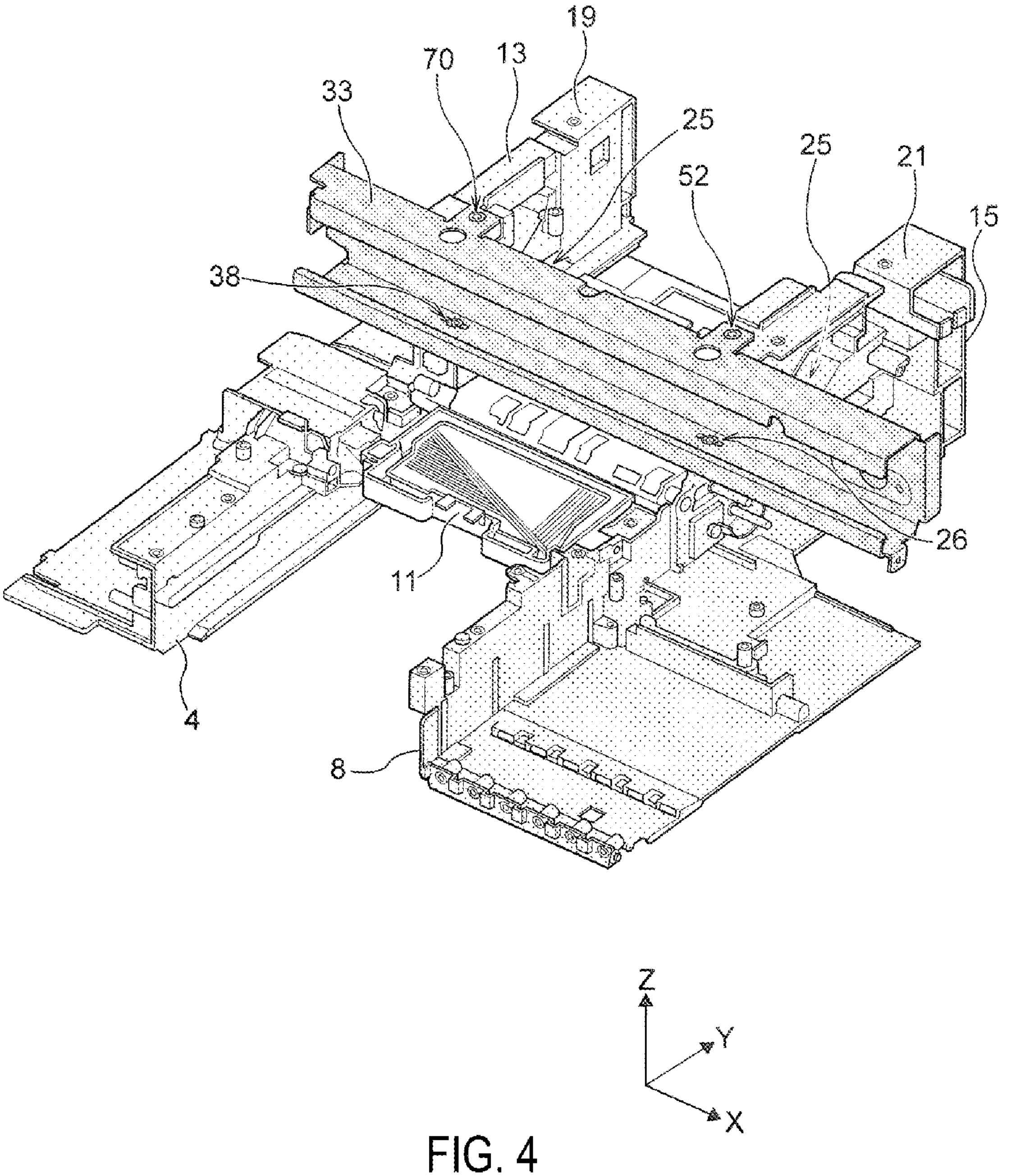
FIG. 4 is a perspective view illustrating an assembled state of respective frames in the first embodiment.
Figure 5:
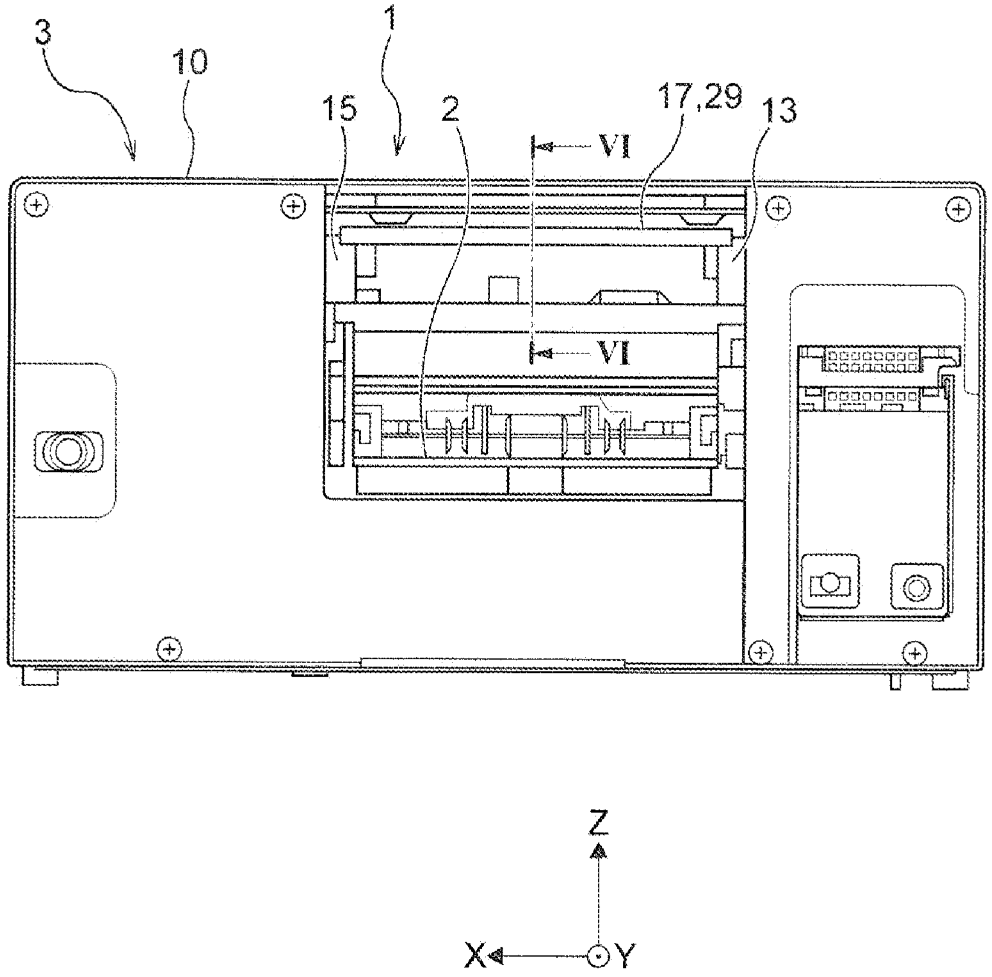
FIG. 5 is a rear view illustrating a state where a reversing unit of the first embodiment is removed.

Further, in the present embodiment, as illustrated in FIG. 4, the first frame 13 and the second frame 15 are respectively provided with a holding portion 25 for holding the reversing unit 9. In FIG. 4, the holding portion 25 is provided at a portion indicated by an arrow on a distal end of a lead line "25". It is sufficient that the holding portion 25 can hold the reversing unit 9, and there is no need to limit the holding portion 25 to a specific configuration and hence, the description of the detailed configuration of the holding portion 25 is omitted. The holding portion 25 provided to the first frame 13 and the holding portion 25 provided to the second frame 15 are formed in the same shape. Here, both holding portions 25 need not have the same shape provided that the holding portions 25 can hold the reversing unit 9.

The reversing unit 9 is configured to be attachable to and detachable from the holding portions 25 in a state where the first frame 13 and the second frame 15 are coupled to each other by the coupling portion 17. In FIG. 3, arrows P indicate directions along which the reversing unit 9 is attached to and detached from the holding portions 25.

In the present embodiment, as illustrated in FIG. 2 and FIG. 3, the coupling portion 17 is disposed at upper surface portions 19, 21 of the first frame 13 and the second frame 15. As illustrated in FIG. 4, the upper surface portions 19, 21 are farthest from a position of the base portion 11 in the Z-axis direction.

Further, as illustrated in FIG. 3, the coupling portion 17 is fixed to the upper surface portions 19, 21 of the first frame 13 and the second frame 15 by screws 23. As illustrated in FIG. 2, threaded holes 14, 16 into which the screws 23 are inserted are formed in the coupling portion 17.

Further, in the present embodiment, the coupling portion 17 includes the bent portion 29 having a shape bent with respect to a base surface portion 27, on a side of one side 18 (FIG. 6) extending along a longitudinal direction (X-axis direction) of the base surface portion 27. Here, the bent portion 29 is bent in an L shape by applying bending to a metal plate constituting the base surface portion 27.

Figure 6:
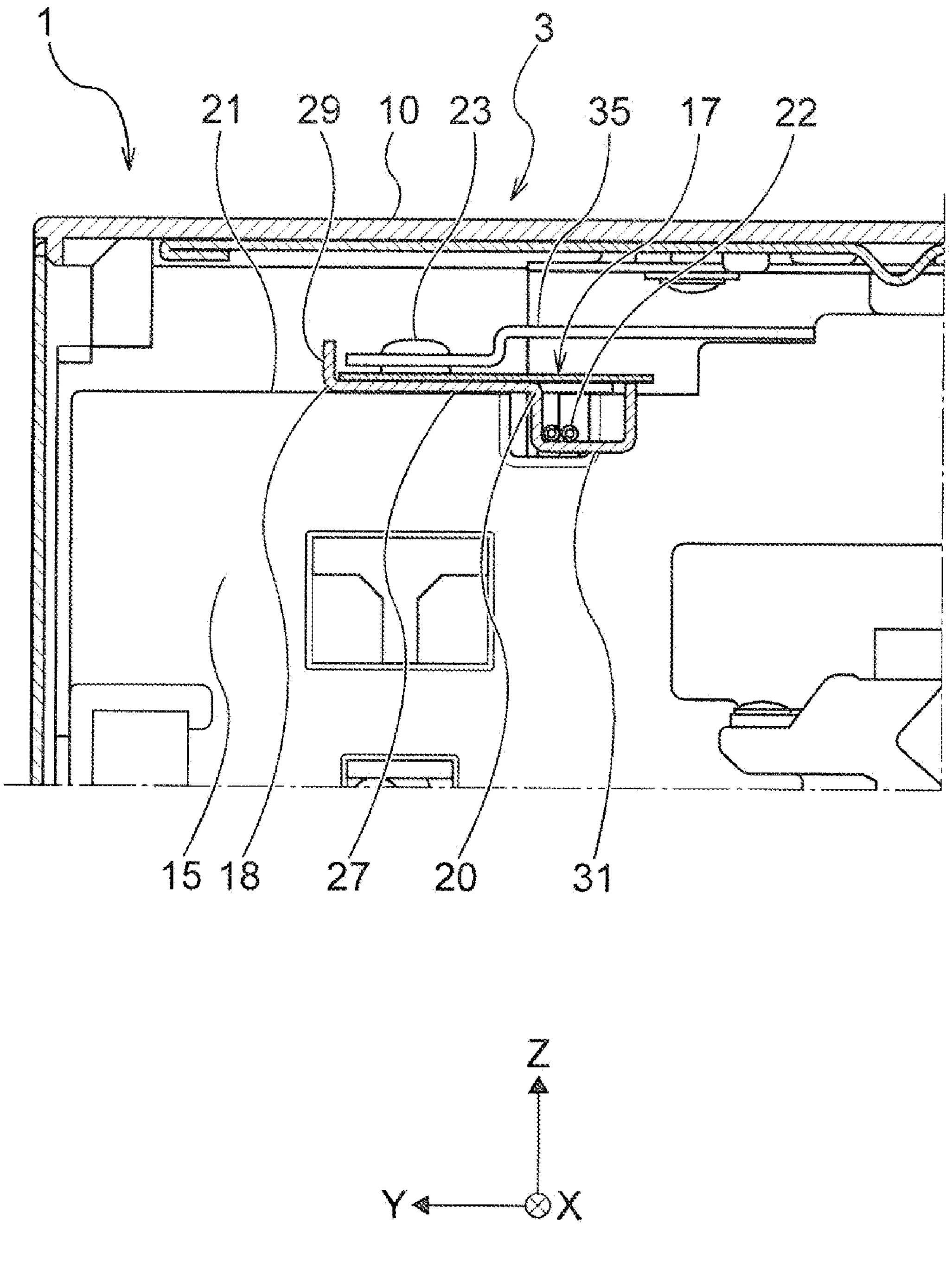
FIG. 6 is a cross-sectional view taken along a line VI-VI in FIG. 5.

Still further, the coupling portion 17 includes a wiring support portion 31 having a shape bent with respect to the base surface portion 27 and configured to support wiring 22, at a side 20 (FIG. 6) of the base surface portion 27 on a side opposite to the bent portion 29. Here, the wiring support portion 31 is formed in a U-shaped groove shape as illustrated in FIG. 6 by applying bending to a metal plate constituting the base surface portion 27.

In the present embodiment, the bent portion 29 and the wiring support portion 31 are formed by bending the base surface portion 27 formed of a metal plate. However, the bent portion 29 and the wiring support portion 31 are not limited to a member formed by bending the metal plate. For example, the bent portion 29 and the wiring support portion 31 may be formed by integral molding of a material.

Processing when Medium is Jammed in Reversing Unit

A medium fed from a medium storage unit (not illustrated) disposed at a bottom portion of the device body 5 of the recording device 1 is transported along the transport path 2, and ink is ejected in a recording region of the recording unit 7 so that recording is performed on a first surface of the medium. The medium on which the recording was performed is transported through the transport path 2, is reversed by being transported through the reversing unit 9, and is made to pass through the recording region of the recording unit 7 again. Recording is performed on a second surface of the medium by the recording unit 7, and the medium is fed to a discharge unit (not illustrated).

When the medium is jammed in the reversing unit 9, firstly, the device body 5 is pulled out from the outer case 3 thus bringing about a state where a user can get access to the reversing unit 9. Next, the reversing unit 9 is pulled out from a position at which the reversing unit 9 is held by the holding portions 25 in a detaching direction in the attaching/detaching direction P. In pulling out the reversing unit 9, the coupling portion 17 is in a state where the coupling portion 17 couples the first frame 13 and the second frame 15 to each other. In a state where the reversing unit 9 is pulled out from the device body 5, the user handles the jam of the medium in the reversing unit 9. The reversing unit 9 in which the jam of the medium has been eliminated is pushed in the attaching direction in the attaching/detaching direction P, and is again brought into a state where the reversing unit 9 is held by the holding portions 25. At the time of pushing the reversing unit 9, the coupling portion 17 is in a state where the coupling portion 17 couples the first frame 13 and the second frame 15 to each other.

Further, in the present embodiment, as illustrated in FIG. 6, a third frame 33 is extended between the first frame 13 and the second frame 15 at a position where the third frame 33 is placed on the upper surfaces of the first frame 13 and the second frame 15. The third frame 33 holds the recording unit 7, that is, the carriage 24 movably in the X-axis direction. The third frame 33 is also referred to as a carriage frame. The third frame 33 is formed of a conductive metal material. As illustrated in FIG. 3 and FIG. 6, the coupling portion 17 is grounded by the third frame 33 and a grounding member 35. The grounding member 35 is coupled to the coupling portion 17 by a screw 23.

Fastening Structure of Third Frame (FIG. 4, FIG. 7 to FIG. 10)

The third frame 33 is attached to the upper surfaces of the first frame 13 and the second frame 15 respectively by four fastening portions of a first fastening portion 26, a second fastening portion 38, a third fastening portion 52, and a fourth fastening portion 70. Positions of the third fastening portion 52 and the fourth fastening portion 70 are higher than positions of the first fastening portion 26 and the second fastening portion 38.

The third frame 33 is a member configured to movably hold the recording unit 7 and hence, the third frame 33 is required to be assembled in a structure in which distortion minimally occurs. That is, even when there is distortion in an assembling state of the base portion 11, the first frame 13, and the second frame 15, the third frame 33 is fastened by a fastening structure that is minimally affected by the distortion. Hereinafter, the fastening structure of the respective fastening portions 26, 38, 52, and 70 is described.

Figure 7A:
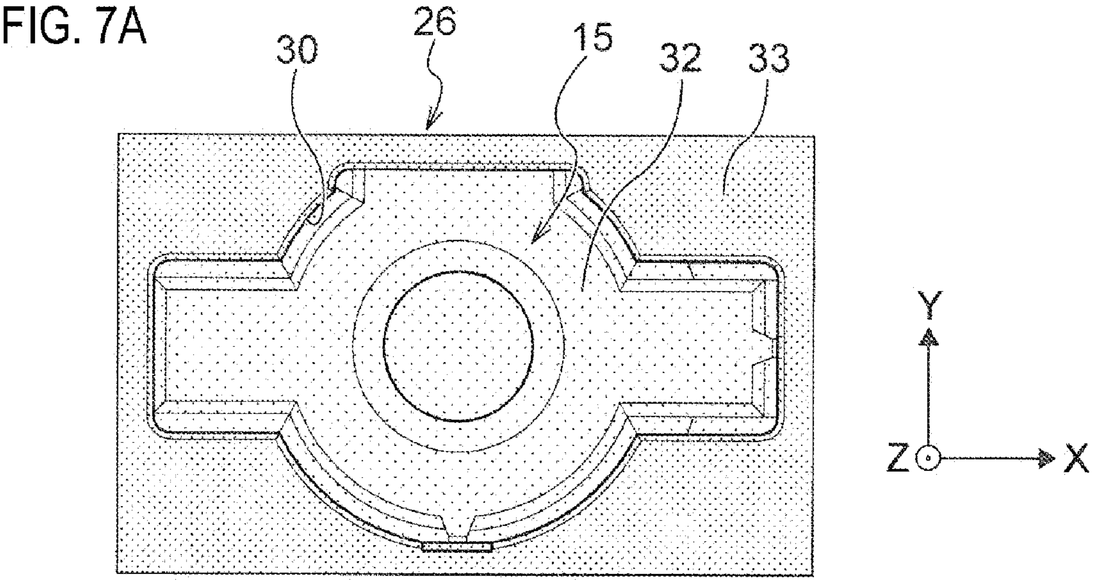
FIG. 7A is a plan view and FIG. 7B is a cross-sectional view of an essential part of a first fastening portion of the first embodiment.
Figure 7B:
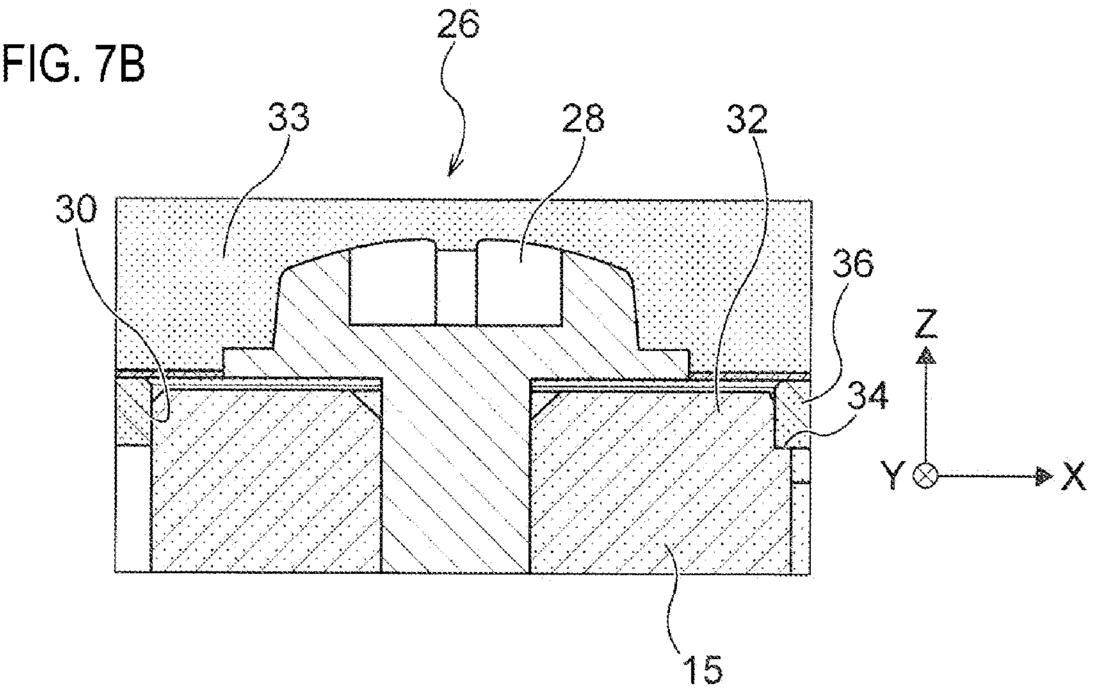

As illustrated in FIG. 7A and FIG. 7B, the first fastening portion 26 is fastened by a screw 28 in a state where the third frame 33 is restricted with respect to the second frame 15 in all of the X-axis direction, the Y-axis direction, and the Z-axis direction. That is, a convex portion 32 provided to the second frame 15 is fitted into a hole 30 formed in the third frame 33 in a state of being restricted in all of the X-axis direction, the Y-axis direction, and the Z-axis direction, and is fastened by the screw 28.

When the convex portion 32 of the second frame 15 is inserted into the hole 30 of the third frame 33, as illustrated in FIG. 7A, the convex portion 32 is restricted in the X-axis direction and the Y-axis direction. That is, the second frame 15 is configured such that a position in the X-axis direction and a position in the Y-axis direction with respect to the third frame 33 are determined. Further, as illustrated in FIG. 7B, the second frame 15 is configured such that a position of the second frame 15 in the Z-axis direction is determined when a placing portion 36 of the third frame 33 is placed on a positioning stepped portion 34 formed at the second frame 15.

Figure 8A:
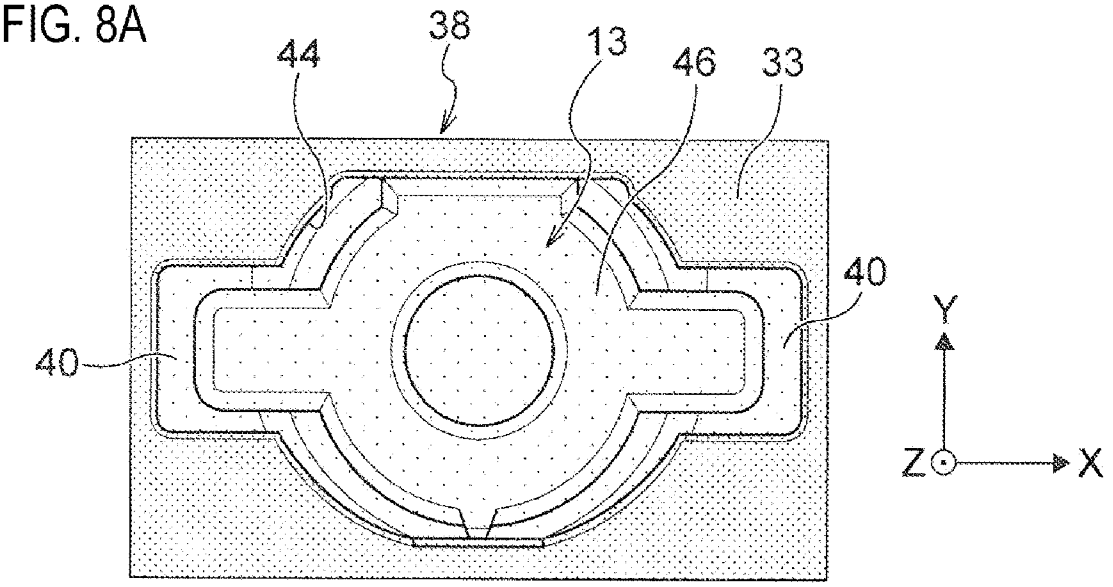
Figure 8B:
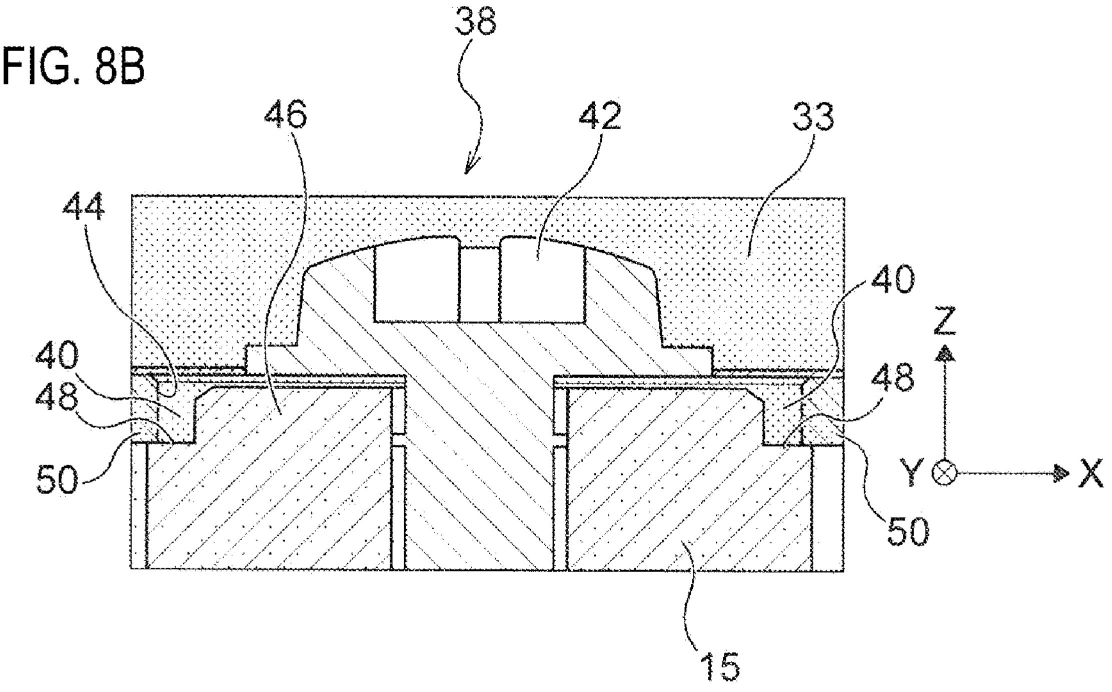

As illustrated in FIG. 8A and FIG. 8B, the second fastening portion 38 is fastened by a screw 42 in a state where the third frame 33 has a gap 40 with respect to the first frame 13 in the X-axis direction, and is restricted in the Y-axis direction and the Z-axis direction with respect to the first frame 13. That is, a convex portion 46 provided to the first frame 13 is fitted into a hole 44 formed in the third frame 33 in a state of having the gap 40 in the X-axis direction and being restricted in the Y-axis direction and the Z-axis direction, and is fastened by the screw 42.

When the convex portion 46 of the first frame 13 is inserted into the hole 44 of the third frame 33, as illustrated in FIG. 8A, the convex portion 46 is restricted in the Y-axis direction. That is, the first frame 13 is configured such that a position in the Y-axis direction with respect to the third frame 33 is determined. Further, as illustrated in FIG. 8B, the first frame 13 is configured such that a position of the first frame 13 in the Z-axis direction is determined when a placing portion 50 of the third frame 33 is placed on a positioning stepped portion 48 formed at the first frame 13.

Figure 9A:
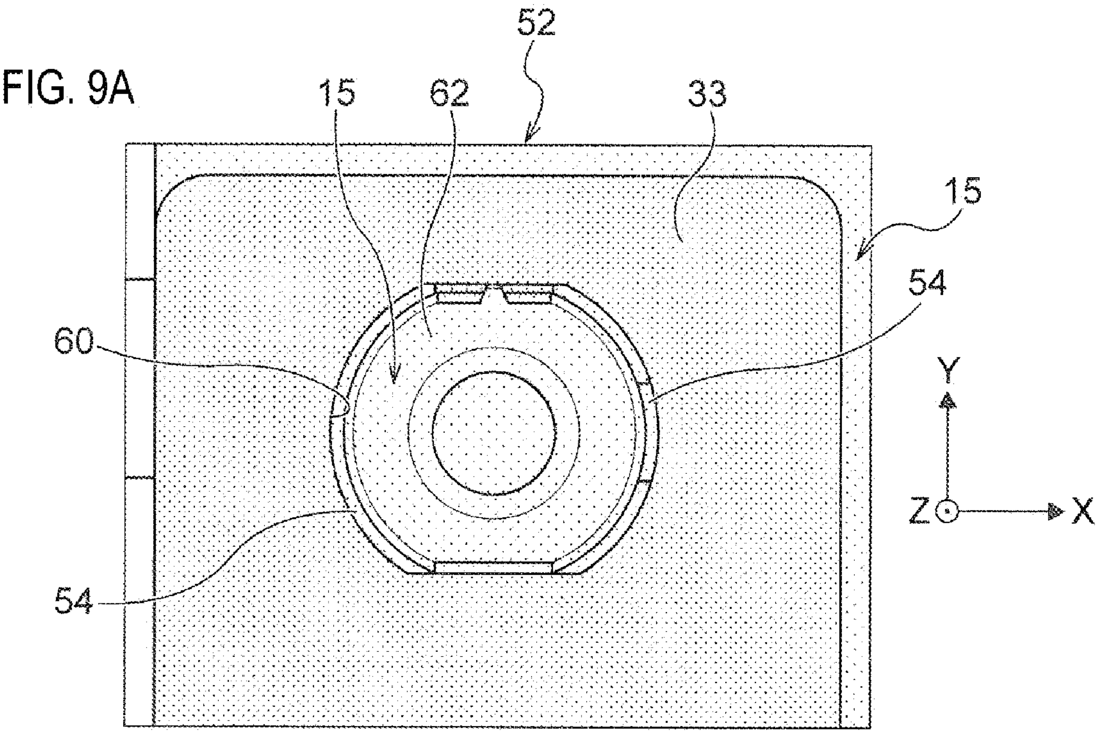
FIG. 9A is a plan view and FIG. 9B is a cross-sectional view of an essential part of a third fastening portion of the first embodiment.
Figure 9B:
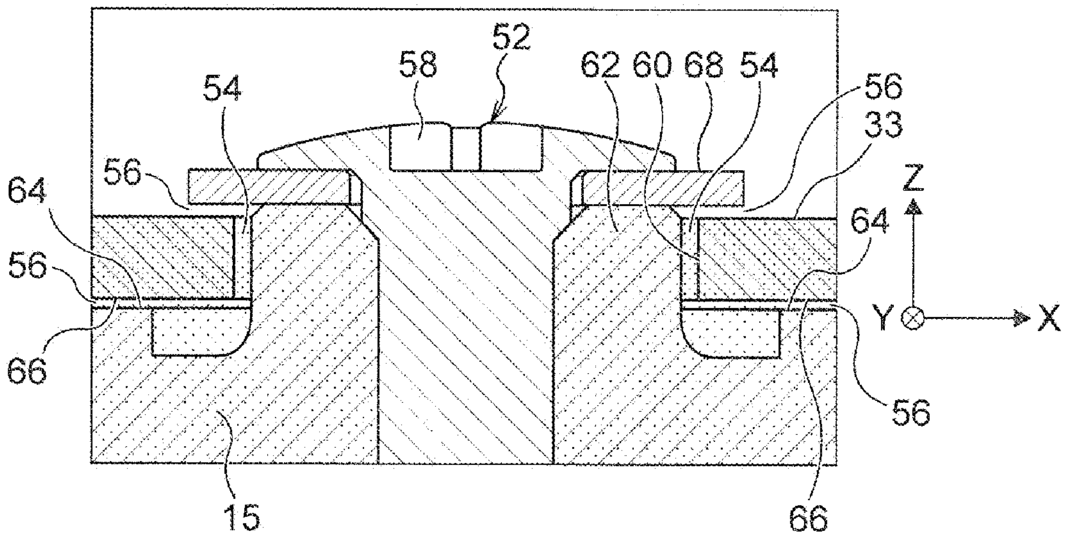

As illustrated in FIG. 9A and FIG. 9B, the third fastening portion 52 is fastened by a screw 58 in a state where the third frame 33 has a gap 54 in the X-axis direction and a gap 56 in the Z-axis direction with respect to the second frame 15, and is restricted in the Y-axis direction with respect to the second frame 15. That is, a convex portion 62 provided to the second frame 15 is fitted into a hole 60 formed in the third frame 33 in a state of having the gap 54 in the X-axis direction and the gap 56 in the Z-axis direction, and being restricted in the Y-axis direction, and is fastened by the screw 58. Symbol 68 indicates a washer.

When the convex portion 62 of the second frame 15 is inserted into the hole 60 of the third frame 33, as illustrated in FIG. 9A, the convex portion 62 is restricted in the Y-axis direction. That is, the second frame 15 is configured such that a position in the Y-axis direction with respect to the third frame 33 is determined. As illustrated in FIG. 9B, the second frame 15 is fastened by the screw 58 in a state where a gap 56 is formed between an upper surface 64 of the second frame 15 on an outer side of the convex portion 62 and a lower surface 66 of the third frame 33 and between an upper surface of the third frame 11 and the screw 58.

Figure 10A:
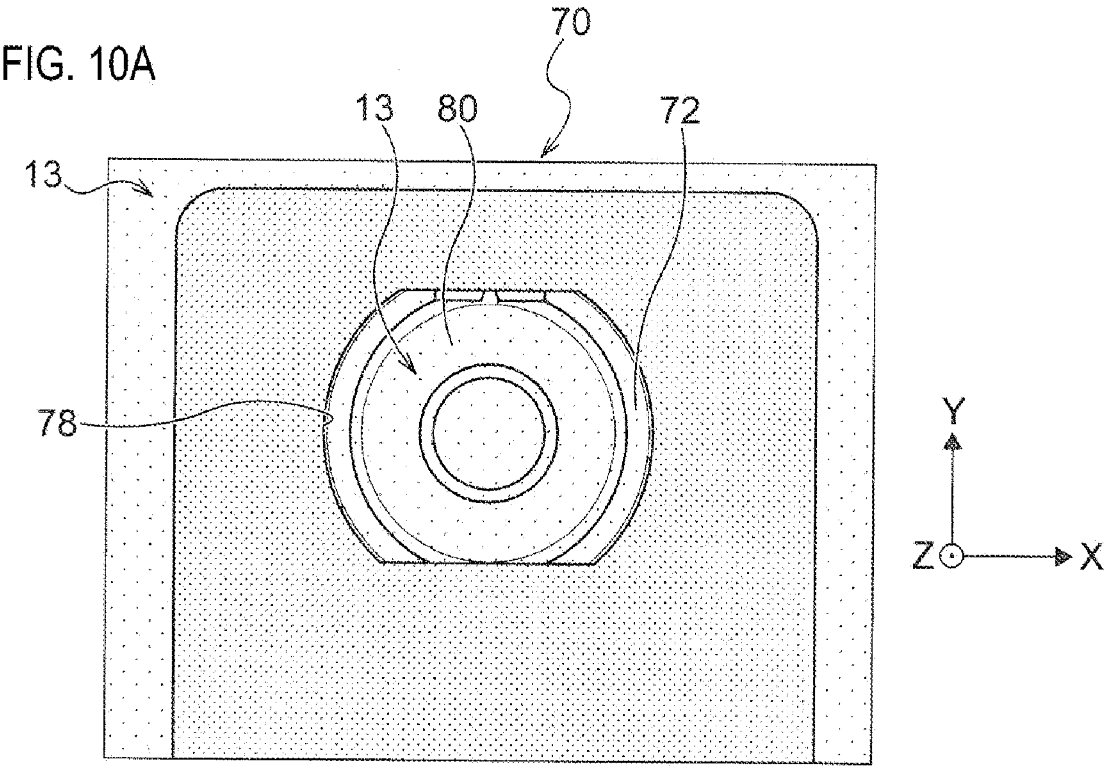
FIG. 10A is a plan view and FIG. 10B is a cross-sectional view of an essential part of a fourth fastening portion of the first embodiment.
Figure 10B:
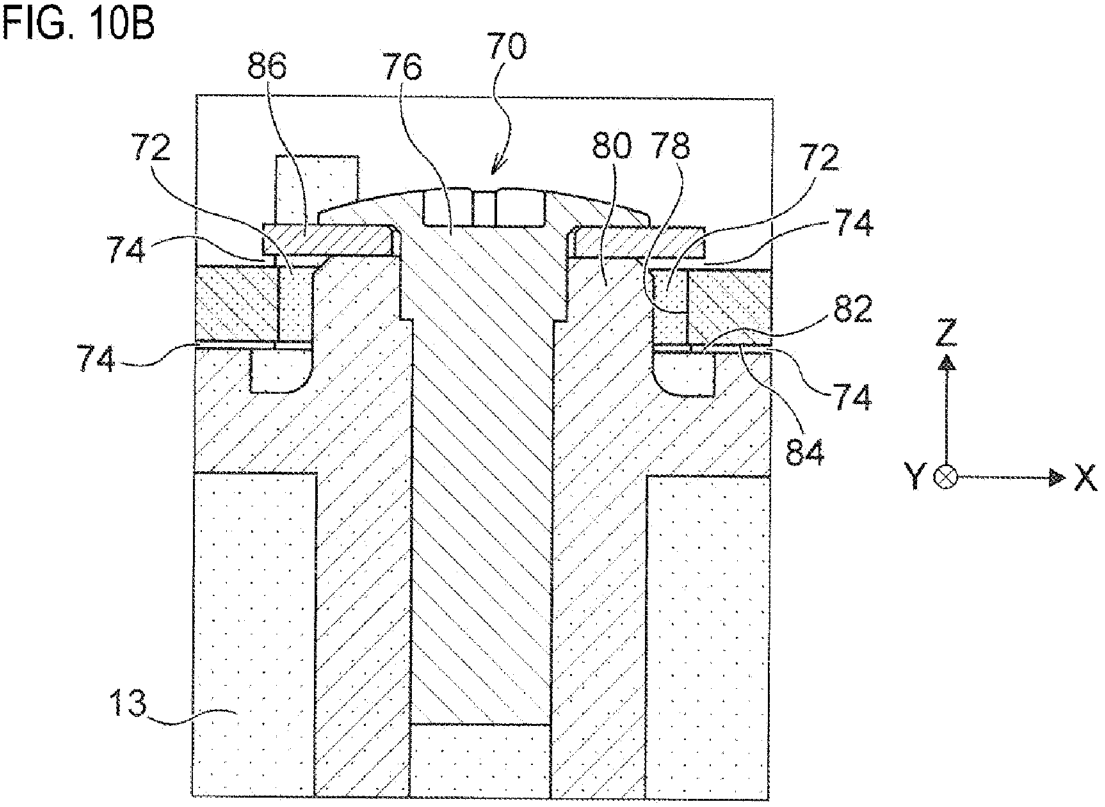

As illustrated in FIG. 10A and FIG. 10B, the fourth fastening portion 70 is fastened by a screw 76 in a state where the third frame 33 has a gap 72 in the X-axis direction and a gap 74 in the Z-axis direction with respect to the first frame 13, and is restricted in the Y-axis direction with respect to the first frame 13. That is, a convex portion 80 provided to the first frame 13 is fitted into a hole 78 formed in the third frame 33 in a state of having the gap 72 in the X-axis direction and the gap 74 in the Z-axis direction, and being restricted in the Y-axis direction, and is fastened by the screw 76. Symbol 86 indicates a washer. The gap 74 of the fourth fastening portion 70 in the X-axis direction is set larger than the gap 54 of the third fastening portion 52.

As illustrated in FIG. 10B, the convex portion 80 of the first frame 13 is restricted in the Y-axis direction since the convex portion 80 is inserted into the hole 78 of the third frame 33. That is, the first frame 13 is configured such that a position in the Y-axis direction with respect to the third frame 33 is determined. Further, as illustrated in FIG. 10B, the first frame 13 is fastened by the screw 78 in a state where a gap 74 is formed between an upper surface 82 of the first frame 13 on an outer side of the convex portion 62 and a lower surface 84 of the third frame 33 and between the upper surface of the third frame 11 and the screw 76.

DESCRIPTION OF ADVANTAGEOUS EFFECT OF EMBODIMENT (1) According to the present embodiment, the recording device 1 includes the base portion 11 disposed below the reversing unit 9, the first frame 13 fixed to the base portion 11 and disposed on the side of the first side surface 4 of the reversing unit 9 to hold the reversing unit 9, the second frame 15 fixed to the base portion 11 and disposed on the side of the second side surface 8 different from the first side surface 4 to hold the reversing unit 9, and the coupling portion 17 coupling the first frame 13 and the second frame 15 at a position away from the base portion 11. With such a configuration, even when a force is applied to the first frame 13 and the second frame 15 that are disposed around the reversing unit 9 and hold the reversing unit 9 in removing the reversing unit 9, the first frame 13 and the second frame 15 are coupled to each other by the coupling portion 17 and hence, a possibility that distortion occurs in the frames around the reversing unit 9 can be reduced.

(2) Further, according to the present embodiment, while the base portion 11, the first frame 13, and the second frame 15 are formed of a synthetic resin material, the coupling portion 17 is formed of a metal material. Accordingly, it is possible to effectively suppress the occurrence of distortion.

(3) Further, according to the present embodiment, the reversing unit 9 is configured to be attachable to and detachable from the holding portions 25 in a state where the first frame 13 and the second frame 15 are coupled to each other by the coupling portion 17. With such a configuration, the attaching operation and the detaching operation of the reversing unit 9 to and from the holding portions 25 can be easily performed in a state where a possibility that distortion occurs in the frames around the reversing unit is reduced.

(4) Further, according to the present embodiment, the coupling portion 17 is disposed at the upper surface portions 19, 21 of the first frame 13 and the second frame 15 and hence, the occurrence of distortion can be effectively suppressed.

(5) Still further, according to the present embodiment, the coupling portion 17 is fixed to the upper surface portions 19, 21 of the first frame 13 and the second frame 15 by the screws 23 respectively and hence, the first frame 13 and the second frame 15 can be firmly coupled to each other.

(6) Further, according to the present embodiment, the coupling portion 17 includes the bent portion 29 having the bent shape and hence, the strength of the coupling portion 17 is increased in terms of shape, and the coupling portion 17 can be formed using a material having a small plate thickness thus realizing the reduction of weight. Still further, the strength of the coupling portion 17 is increased and hence, the possibility that the distortion occurs can be effectively reduced.

(7) Further, according to the present embodiment, the coupling portion 17 includes the wiring support portion 31. With such a configuration, the wiring 22 is held by the wiring support portion 31 and hence, the wiring 22 does not become an obstacle in attaching and detaching the reversing unit 9 so that also a possibility that the wiring is broken is low.

Further, the wiring support portion 31 is formed in a shape bent with respect to the base surface portion 27 and hence, the strength of the coupling portion 17 can be increased in terms of shape.

Further, the coupling portion 17 includes the bent portion 29 on a side of the one side 18 of the base surface portion 27, and includes the wiring support portion 31 having the bent shape at the side 20 of the base surface portion 27 on a side opposite to the one side 18 and hence, the strength of the whole coupling portion 17 is further increased by the bent shape located at both sides, and the coupling portion 17 can be formed by a material having a smaller plate thickness, whereby the further reduction of weight can be realized.

(8) According to the present embodiment, the recording device 1 includes the third frame 33 configured to movably hold the recording unit 7 and formed of a metal material, and the coupling portion 17 is grounded by the third frame 33. With such a configuration, the grounding of the coupling portion 17 can be easily performed.

(9) According to the present embodiment, the recording device 1 includes the outer case 3 forming the external appearance of the recording device 1, and another recording device is placeable at the top surface 10 of the outer case 3. With such a configuration, a plurality of recording devices can be used in a stacking manner, and the increase of installation space can be suppressed.

Other Embodiments

Although the recording device according to the present disclosure basically have the configurations of the embodiments described above, of course, it is possible to change or omit a partial configuration within a range that does not deviate from the gist of the present disclosure.

In the above-described embodiments, the case has been described where the coupling portion 17 is disposed at the upper surface portions 19, 21 of the first frame 13 and the second frame 15. However, the present disclosure is not limited to such a case, and the coupling portion 17 may be disposed on other portion. That is, the coupling portion 17 may be disposed other portion provided that the reversing unit 9 can be attached to and detached from the holding portions 25 in a state where the first frame 13 and the second frame 15 are coupled to each other by the coupling portion 17.

In the above-described embodiment, the case has been described where the coupling portion 17 includes the bent portion 29 on a side of the one side 18 of the base surface portion 27, and the wiring support portion 31 having the bent shape at the side 20 of the base surface portion 27 on a side opposite to the one side 18. However, the coupling portion 17 may have a structure in which the bent portion 29 is not included and the wiring supporting portion 31 having the bent shape is provided at one side in the longitudinal direction of the base surface portion 27.

With such a configuration, the coupling portion 17 includes the wiring support portion 31 having the bent shape and hence, the strength of the coupling portion 17 can be increased in terms of shape, the coupling portion 17 can be formed of a material having a small plate thickness, whereby the reduction of weight can be realized. Further, the wiring 22 is held by the wiring supporting portion 31 and hence, the wiring 22 does not become an obstacle when the reversing unit 9 is attached or detached so that also a possibility that the wiring 22 is broken is low.

What is claimed is:

1. A recording device comprising:

a recording unit configured to perform recording on a medium;

a reversing unit configured to bend and reverse the medium on which recording was performed by the recording unit and that is transported along a transport path and guide the medium toward a recording unit side;

a base portion disposed below the reversing unit;

a first frame fixed to the base portion and disposed on a side of a first side surface of the reversing unit, the first frame being configured to hold the reversing unit;

a second frame fixed to the base portion and disposed on a side of a second side surface different from the first side surface, the second frame being configured to hold the reversing unit; and a coupling portion coupling the first frame and the second frame to each other at a position away from the base portion, wherein the reversing unit is detachable from a main body of the recording device, the first and second frames being part of the main body of the recording unit such that the first and second frames are not detached when the reversing unit is detached, and wherein the coupling portion includes a wiring support portion on a side of one side extending along a longitudinal direction of a base surface portion, the wiring support portion having a shape bent with respect to the base surface portion and being configured to support wiring.

2. The recording device according to claim 1, wherein the base portion, the first frame, and the second frame are formed of a synthetic resin material and the coupling portion is formed of a metal material.

3. The recording device according to claim 1, wherein the first frame and the second frame each include a holding portion configured to hold the reversing unit and the reversing unit is attachable to and detachable from the holding portion in a state where the first frame and the second frame are coupled to each other by the coupling portion.

4. The recording device according to claim 1, wherein the coupling portion is disposed at upper surface portions of the first frame and the second frame.

5. The recording device according to claim 1, wherein the coupling portion is fixed to upper surface portions of the first frame and the second frame by screws.

6. The recording device according to claim 1, further comprising an outer case forming an external appearance, wherein another recording device is placeable at a top surface of the outer case.

7. A recording device comprising:

a recording unit configured to perform recording on a medium;

a reversing unit configured to bend and reverse the medium on which recording was performed by the recording unit and that is transported along a transport path and guide the medium toward a recording unit side;

a base portion disposed below the reversing unit;

a first frame fixed to the base portion and disposed on a side of a first side surface of the reversing unit, the first frame being configured to hold the reversing unit;

a second frame fixed to the base portion and disposed on a side of a second side surface different from the first side surface, the second frame being configured to hold the reversing unit; and a coupling portion coupling the first frame and the second frame to each other at a position away from the base portion, wherein the reversing unit is detachable from a main body of the recording device, the first and second frames being part of the main body of the recording unit such that the first and second frames are not detached when the reversing unit is detached, the coupling portion includes a bent portion on a side of one side extending along a longitudinal direction of a base surface portion, the bent portion has a shape bent with respect to the base surface portion, the coupling portion includes a wiring support portion at a side of the base surface portion on a side opposite to the bent portion, and the wiring support portion has a shape bent with respect to the base surface portion and is configured to support wiring.

8. A recording device comprising:

a recording unit configured to perform recording on a medium;

a reversing unit configured to bend and reverse the medium on which recording was performed by the recording unit and that is transported along a transport path and guide the medium toward a recording unit side;

a base portion disposed below the reversing unit;

a first frame fixed to the base portion and disposed on a side of a first side surface of the reversing unit, the first frame being configured to hold the reversing unit;

a second frame fixed to the base portion and disposed on a side of a second side surface different from the first side surface, the second frame being configured to hold the reversing unit; and a coupling portion coupling the first frame and the second frame to each other at a position away from the base portion, wherein the reversing unit is detachable from a main body of the recording device, the first and second frames being part of the main body of the recording unit such that the first and second frames are not detached when the reversing unit is detached, the base portion, the first frame, and the second frame are formed of a synthetic resin material, the coupling portion is formed of a metal material, and the recording device further includes a third frame that is extended between the first frame and the second frame, that is configured to movably hold the recording unit, and that is formed of a metal material and the coupling portion is grounded by the third frame.

* * * * *